3,129,110
PROCESS OF PRODUCING DECORATIVE
PLASTIC SURFACES
Theodore R. Anderson, Oakland, Calif., assignor to The Glidden Company, Cleveland, Ohio, a corporation of Ohio
No Drawing. Filed July 31, 1958, Ser. No. 752,200
5 Claims. (Cl. 117—37)

This invention relates to novel decorative plastic surfaces and it relates more particularly to a method of preparing an irregular and attractive design on a substrate coated with a resinous substance. My invention will be more fully understood by reference to the description in the following specification.

Ever since the advent of gelable polyester resins and their use as decorative coatings for fiberglass reinforced polyester laminates and the like, it has been possible to spatter one color of a gelable polyester resin on a mold and then cover it with a contrasting color of another gelable polyester resin. Thus, when the laminate is removed from the mold, the spattered color is imprinted on the background color giving a multicolor finish to the laminated article.

The above method of obtaining a multicolor finish has a drawback in that the spattered gelable polyester resin is very regular in shape; that is, mainly circular, and is, therefore, not as attractive as might be desired. By the process of my invention, I have been able to provide an irregular and attractive pattern with a spatter coat of a gelable polyester resin.

It is an object of my invention to provide a method for obtaining an irregular pattern with a spatter coat of a gelable polyester resin.

It is a further object of my invention to provide a novel, decorative finish on substrates to be coated with known gelable polyester resins.

It is a further object of my invention to provide a method whereby a gelable polyester resin is spattered on a substrate to thereby obtain a surface containing a webby appearance and a pattern which is irregular in size and shape.

In accordance with the foregoing, I have found that I can accomplish my objects by dissolving a polyvinyl acetate resin in a gelable polyester resin and applying the so-formed solution to a substrate to be coated. Further in accordance with my invention, I apply a catalyzed gelable polyester resin on the substrate either before or after the spattered solution to thereby obtain a unique and attractive coating upon curing said coated surface.

As noted above, the two main compositions to be employed in the process of my invention are selected from compositions comprising a resinifiable polyester resin, which resin can be caused to gel, and a polyvinyl acetate resin; all of which compositions have heretofore been known to the art. In accordance with my invention, I have found that polyvinyl acetate resins, especially those of high molecular weight, are compatible with polyester resins in the liquid state, and that when a solution of the two resins is sprayed on a substrate, a "webby" decorative and attractive finish is thereby obtained. Curing of the coating, e.g. by adding accelerators and/or catalysts, at room temperature or at an elevated temperature results in a permanent webby design on the coated substrate.

Polyvinyl acetate resins are well known and so are their methods of manufacture. In order, however, to more fully describe this invention, a brief description of two methods of preparing these polyvinyl acetate resins will be described.

One method of preparing a resin of high-molecular weight from vinyl acetate is that of suspension polymerization. Suspension polymerization is achieved by dispersing vinyl acetate in the form of small globules in a non-solvent medium; that is, a liquid carrier which in the case of vinyl acetate is usually water or an aqueous solution, strongly agitating the solution and subjecting the vinyl acetate in suspension to polymerizing conditions. The reaction is carried out in the presence of a vinyl acetate-soluble catalyst and of a suspension stabilizer, the function of the latter being to keep the vinyl acetate globules dispersed during the reaction. Each liquid vinyl acetate globule is converted into a hard or rubbery bead of polymer. Further detailed description of this method can be found in the literature.

The second known method of preparing a polyvinyl acetate resin is that of emulsion polymerization. This method is based principally on the use of three essential ingredients; that is, emulsifiers, activators and modifiers. All three ingredients are required for a smooth and rapid conversion of an emulsion of a vinyl acetate into a latex of a substantially soluble polymer at such low temperatures that the process can be kept under control and that unwarranted side reactions can be avoided to a sufficient extent. Polymerization by emulsion is usually carried out under normal pressures (as is the case with suspension polymerization) and in the temperature range of from $-20°$ to $60°$ C. Emulsion polymerization employs a fine emulsion of oil-soluble vinyl acetate in water and initiates the reaction with a system of water-soluble catalysts. In emulsion polymerization, a soap is ordinarily used as a surfactant and the vinyl acetate/water ratio is ordinarily less than that in suspension polymerization. The amount of soap or colloid employed is usually within the range of 2–5 percent and the amount of catalyst about 1 percent.

Although the above description of methods for preparing polyvinyl acetate resins is not intended as a detailed and complete teaching, it should be realized that these methods are well known in the art and further reference to the literature can be made for detail.

Many polyvinyl acetate resins are available commercially as proprietary products and in the description of my invention and further in the specific examples to be given hereafter as illustrations thereof, commercial resins such as Bakelite's vinyl acetate resin, "Vinylite AYAT," and Shawinigan Products Corporation's "Gelva" resins were employed. The Gelva resins were used because they are available in a very broad range of molecular weights and serve to illustrate the range of molecular weights of the polyvinyl acetate resins that can be employed in the process of my invention. I have found that polyvinyl acetate resins of a molecular weight of from about six thousand to nine hundred thousand can be successfully used in the practice of my invention. Specific reference to these polyvinyl acetate resins will be made hereinafter.

As is the case of the polyvinyl acetate resins of commerce, the other resin employed in my invention (that is, the gelable polyester resin) is also well known to the art.

A polymerizable unsaturated polyester is prepared by reaction of a polyhydric alcohol with ethylenically unsaturated polycarboxylic acid. It is preferable to employ a dihydric alcohol and a dicarboxylic acid in order to produce a product in which there is a maximum esterification of the acid and alcohol radicals without excessive viscosity. Ordinarily it is desirable that the unsaturated polyester be polymerizable into an infusible or high melting point resin so that the proportion of unsaturated components should be such tha tthe polyester contains an average of more than one double bond per molecule; for example, there may be an average of eleven or more double bonds in every ten molecules of the polyester.

The polymerizable unsaturated polyester can be produced by reaction of any desired combination of polycarboxylic acid and polyhydric alcohol. For example, an unsaturated dicarboxylic acid such as maleic, fumaric, itaconic, citraconic or mesaconic acid can be reacted with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Each of such unsaturated dicarboxylic acids contains a polymerizably reactive $\Delta^{2,3}$-enedioyl group, and a polymerizable unsaturated polyester or alkyd prepared from any one of such acids, contains a plurality of such polymerizably reactive $\Delta^{2,3}$-enedioyl groups. In other words, each of the acids contains a polymerizably reactive $\Delta^{2,3}$-enoyl group, i.e., a group having the structure

and such groups are contained in dioyl radicals in the polyester molecule; hence, the dioyl radicals may be defined as $\Delta^{2,3}$-enedioyl radicals (e.g., butenedioyl or ethenedicarboxylyl radicals).

Instead of a single polycarboxylic acid, a mixture of polycarboxylic acids can be employed, such as a mixture of an unsaturated dicarboxylic acid with a polycarboxylic acid containing more than two acid radicals, such as citric acid. A mixture of polyhydric alcohols can be employed, such as a mixture of dihydric alcohol with a polyhydric alcohol containing more than two hydroxyl groups, such as glycerol.

In the preparation of the polymerizable unsaturated polyester, any of the usual modifiers such a monobasic acids, monohydric alcohols and natural resin acids can be added. The larger the proportions of monobasic acids and monohydric alcohols, the lower is the average number of acid and alcohol residues in the resulting polyester molecules, and the lower is the viscosity of the polyester. On the other hand, the more nearly equal the moleular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also can be varied by selecting various reacting ingredients and varying their proportions. The infusibility, hardness and inertness of the product obtained by polymerization of the polyester can be increased by varying the initial reacting ingredients to increase the average number of double bonds per molecule of the polymerizable polyester.

The point to which the reaction of the ingredients is carried in the preparation of the polymerizable polyester is simply that point at which the product has the desired properties. The consistency or viscosity of the polyester varies directly with average number of acid and alcohol residues in the molecule. For example, the average number of residues in the molecule of the polyester can vary from about three to about one hundred twenty.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired inhibitor such as hydroquinone, pyrogallol, tannic acid or any aromatic amine, such as aniline or phenylene diamine can be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction can be carried to an acid number of about 20. The use of an acid catalyst can make it possible to attain a lower acid number without substantial polymerization. Modifications are numerous and include modification of the unsaturated polyester with saturated alkyd-type resins, oil-modified alkyd resins, etc. Modification is contemplated also with a minor amount of one or more liquid, ethylenically unsaturated monomeric materials containing aliphatic carbon-to-carbon unsaturation and compatible and co-polymerizable with said polyester, e.g., styrene, divinyl benzene, vinyl toluene and other nuclearly-substituted styrenes; diallyl esters such as diallyl phthalate, diallyl succinate, diallyl maleate, diallyl itaconite, etc.; and other unsaturated esters such as divinyl maleate, dioctyl itaconate, dibenzyl itaconate and the like. The art of preparing such curable polymerizable materials and their compositions is well known (as shown by U.S. Patents Nos. 2,420,740, 2,453,665, 2,593,787, 2,409,633, 2,433,735–2,443,741, 2,450,552, 2,255,313, 2,512,410, 2,280,256, 2,453,666, 2,510,168, 2,635,089, 2,645,626 and U.S. applications Serial No. 523,637, filed July 21, 1955, now abandoned and Serial No. 377,265, filed August 28, 1953, now Patent No. 2,777,829.

It is well known to those skilled in the unsaturated polyester resin art that 100% polymerizable polyester liquids can be suitably formulated to be curable to a gelled state in advance of the fully-cured state. Curing of the liquids involves exothermic reactions, which exothermicity tends to accelerate the reactions. If polymerization is uncontrolled, as by the non-use of known polymerization stabilizers and/or inhibitors, the reactive mass cannot be easily kept from proceeding to its fully cured state, but by including appropriate polymerization stabilizers and/or inhibitors, the mass can be rendered amenable to a gelling treatment in advance of the final curing treatment. The examples illustrate the use of inhibitors, stabilizers and pigmentation to control the reactivity so that the desired gelled but uncured state can be attained controllably in advance of the fully cured state. In general, gelable polyester masses of the types herein described and illustrated above are 100% polymerizable and are usually mixtures of two or more unsaturated polyester types or formulations with polymerizable ethylenically-unsaturated monomeric agents containing aliphatic carbon-to-carbon unsaturation. Nevertheless, a single polyester type or formulation can be used by itself, just as well. It is more common, though, to mix two or more different ones together since in this way a few stock resin types or formulations can be maintained and from them a large number of blends can readily be prepared. The stock formulations are commonly distinguished from each other on the basis of the rigidity or flexibility of the resins they yield. Thus, one might give a flexible resin, another might give a semi-rigid resin, and a third might give a rigid resin. The compositions identified hereinbelow as polyester A, polyester B and polyester C, etc., correspond in principle with this practice, and their various blends (as in the examples) give cured resinous coatings of various degrees of rigidity, selected for the type of service for which the finished product is intended. Those skilled in the art of formulating unsaturated polyester resins recognize that the proportions of saturated carboxylic acids to $\alpha,\beta$-unsaturated carboxylic acids, the length of the carbon chain(s) involved in the carboxylic acids and in the polyhydric alcohols, the proportion of polyester to polymerizable unsaturated monomer containing aliphatic carbon-to-carbon unsaturation, the degree of functionality in the carboxylic acids and polyhydric alcohols, and the curing treatment(s), are all factors affecting the flexibility and/or rigidity of the cured resin. In principle, the present invention can be practiced in connection with any 100% polymerizable polyester formulation or mixture of formulations which can be gelled in an incompletely cured state. As those skilled in the art are aware, this feature of being gelable without being fully cured can be imparted to any unsaturated polyester mass whether clear or pigmented by incorporating known polymerization catalysts, stabilizers and inhibitors in amounts and proportions which are fixed largely by the particular polymerizable polyester mass at hand. When that mass is pigmented, particularly with amounts and kinds of pigment which in the aggregate possess what is known in the art as high oil absorption, then a wholly different combination (i.e., kinds and/or amounts) of polymerization catalysts, stabilizers and inhibitors is apt to be needed than if the same polyester mass without any pigment therein were being formulated to secure the quality of gelability without full curing. Any of the usual pigments, inert fillers and extenders can be used, but it is desirable that they be free of or contain only small amounts of reactive metals such as iron, lead, zinc, etc. and/or their compounds. Some oxides of iron, however, are apparently not reactive in polyester resins. Thus, I have used both red and black iron oxides with good results. Actually, polyesters with black iron oxide have longer storage life than polyesters with carbon black. Inerts of high oil absorption (e.g. silicates, silica gel) are preferred, only enough high-hiding pigment being used to serve the purpose at hand. In highly pigmented gelable polyester masses, it is desirable to exclude zinc and lead pigments since they tend to stiffen the resulting mass. This stiffening effect is not objectionable in the more fluid, less-highly pigmented formulations.

In the practice of one embodiment of my invention, I have employed modified polyester resins of the type described in copending application Serial No. 612,072, filed September 25, 1956, now U.S. Patent No. 3,077,424, and that application is incorporated herein by reference. In general, that copending application describes a method of modifying polyester resins of the type described above by imparting hold-out properties to said resin. The invention described in said copending application provides for the incorporation of certain finely-divided inorganic solids which modify the rheological characteristics of the polyester mass toward the characteristics of thixotropy. One such material is short fiber asbestos of fine standard plastic filler grade. Others include pulverized dehydrated silica gel in an uncompressed state, e.g. "Cab-o-sil," Godfrey L. Cabot Co., "PD–244 silica," Davison Chemical Co., or "Santocel," Monsanto Chemical Co., certain natural and/or treated clays which include combined water in their structure (so-called hydrous clays), e.g. bentonite, etc.

The asbestos shorts, silica gel and hydrous clays are employed in small amounts usually between about 0.5% and 10% by weight. Different amounts of each are needed, when used individually, to develop optimum hold-out. Where mixtures are used, one must usually experiment to determine the optimum amount for each of the different mixtures since the effects do not appear to be directly additive. It will be noted that each of the three classes of materials is of hydrous nature, having small amounts of water combined chemically into its make-up, and it is believed that it is the hydrous quality of each and the great surface area presented that aids in developing the presently-desired rheological properties. The silica gels represented by Cab-o-sil, Santocel and PD–244 silica are dry free-flowing powdery products which still contain small amounts of combined water in their gel structure and are submicroscopic particles having an $SiO_2$ content (dry basis) of 99.0–99.7%, a free moisture content of 0.2–2.0% at 105° C. and a negligible content of CaO, MgO and $Fe_2O_3$; (see U.S. Patents 2,249,767, 2,535,063, 2,631,082 and 2,625,492, whose teachings are here incorporated by reference). Opaline hydrous siliceous minerals such as hyalite and diatomite are natural products comparable to the above manufactured products which in comminuted form can also be used if low in iron oxides. They can be acid washed to lower the iron content.

After the desired rheological properties have been attained as described under the preceding heading, finely divided solid materials of a hard abrasive nature are added to impart reinforcement and particularly skid-proofness. Thus, pulverized sand, pumice, aluminum carbides, aluminum silicides, garnet, glass, porcelain, blast-furnace slag, etc., represent comminuted abrasive materials which can be used. I especially prefer pumice but this preference need not restarin one from practicing the invention with one or more of the other abrasive materials identified above. The pumice (or other abrasive powder) is added to the rheologically modified polyester mass in relatively large but uncritical amounts. Such amounts can range from about 10% to 50% by weight of the unsaturated polyester.

Color pigments and conventional fillers and extenders such as talc, mica, asbestine, sawdust, paper-maker's clays, limestone (or other forms of calcium carbonate) can also be included to extend the polyester mass, and where such materials possess a desired color, they impart useful color qualities. Most conventional pigments can be used for color and/or hiding even though a few tend to impede cure of the polyesters.

The methods of preparing gelable polyester resins described in U.S. Patent 2,817,619 etc., are incorporated herein by reference.

Athough the above description of the resins employed in my invention is deemed sufficient insofar as the preparation and nature is concerned, it is desirable to point out certain properties of the polyvinyl acetate resins that are of importance to the webbing-gelable coatings of my invention. Thus, I have found that solutions of polyvinyl acetate resins, especially the higher molecular weight resins, have a strong tendency to "string" or "cobweb" when sprayed, and this tendency is still present when the polyvinyl acetate resin is dissolved in a gelable polyester resin. Thus, upon spraying of a polyester-polyvinyl acetate resin solution, the gelable coating will cobweb.

Polyvinyl acetate resins are compatible with polyester resins while in the liquid state. When the polyester resin is cured, the polyvinyl acetate becomes incompatible, but this is not detrimental to the end product. The polyvinyl acetate resins do not undergo or are subjected to any hydrolysis. Usually the resins of commerce contain a small percentage (1 to 2%) of volatile material which is not detrimental to the final product.

The viscosities of solutions of polyvinyl acetate resins applicable in the process of my invention were determined by dissolving the resin in benzene and then measuring the viscosity with an Ostwald viscosimeter, or equivalent.

In this instance, 86 grams of the resin were added to 1000 ml. of benzene at 20° C. and the viscosity in centipoises determined. Suitable resins that can be employed in the process of my invention are those having a viscosity of from 6 to 900 centipoises (and higher) as determined by this method. The molecular weight of such resins is approximately from about six thousand to nine hundred thousand. Shawinigan Corporation's Gelva V7 to V800 are suitable polyvinyl acetate resins. In the case of the resins having a viscosity of from 6 to 8 centipoises as measured above, a very volatile solvent such as acetone can be used. However, it is not particularly desirable to employ such a volatile solvent and therefore, I prefer to employ resin solutions of a viscosity, say, of from 15 to 900 centipoises or higher.

In the actual practice of my invention, I have found that the polyvinyl acetate-polyester resin webbing solution need not be catalyzed when sprayed on a substrate to be coated. The catalyst contained in the background color-imparting gelable polyester resin which is applied over the sprayed webbing-gelable coat will cure the sprayed resins at the same time. If the background color-imparting gelable polyester resin is applied first to the substrate (as in the case of those polyesters containing hold-out imparting ingredients), then it is only necessary that the spattered gelable polyester solution be applied (without catalyst, preferably) before the background color has gelled. In either case, the catalyst need only be employed in the coating applied as the background, i.e. the non-spattered or non-polyvinyl acetate containing coat.

As a further explanation of the manipulations deemed necessary in the practice of my invention the following is offered. When a decorative finish is desired on a polyester fiberglass laminate or molding, the webbing-gelable polyester is applied first (usually by spraying) to the mold and then the substrate, in this case the laminate, is constructed over the sprayed gelable polyester. When the article is removed from the mold, the sprayed webbing-gelable polyester that was against the mold will then be exposed. If both a decorative and protective finish is desired on polyester fiberglass laminates, wood, concrete, metal, etc., then a webbing-polyester containing the desired hold-out imparting ingredients is applied over the existing substrate. In some cases, e.g. a polyester fiberglass boat, both a webbing-gelable polyester resin (decorative finish) and a webbing-gelable polyester containing hold-out imparting ingredients (decorative and protective finish) can be applied to a laminate which is a substrate for both of the finishes.

The spatter coat composition consisting of either a decorative or a decorative and protective finish can be pigmented to any desired color. Curing can be affected at room temperature but also at elevated temperatures as will be demonstrated hereinafter.

Curing at elevated temperatures can be varied from 3 hours at 125° to 3 to 4 minutes at 250° F. (mold temperature). Thus, it can be seen that a broad range of curing temperatures can be used for polyester resins. As noted, catalysts and accelerators can be added in amounts to give the shortest possible curing time while keeping the working life of the polyester resin long enough to fabricate the article before the resin gels.

The amount of catalyst to be employed in the background coat (whether applied first or last) can be varied, but usually between about 1 to 2% of methyl ethyl ketone peroxide by weight or equivalent can be employed. The amount of webbing solution, i.e. polyvinyl acetate-polyester resin solution to be spattered on the substrate can be varied according to the fabricators like etc. or the consumers taste for the particular design.

Also, the proportion or parts by volume or weight of the polyester to polyvinyl acetate can be varied and an excellent webbing solution can be obtained by dissolving one part by volume of polyvinyl acetate to four parts by volume of polyester solution. After the two resins are mixed, the resulting solution can be sprayed as is known. The choice of polyvinyl acetate resin, the viscosity of the gelable coating and the spraying pressures will affect the pattern of the webbing gelable-coating.

The specific examples offered below demonstrate, but do not limit, the practice of my invention.

EXAMPLE 1

Part 1

A liquid polyester (designated polyester A) of the rigid type was prepared from:

| | |
|---|---|
| Propylene glycol, industrial | 2,960 lbs. |
| Maleic anhydride | 1,689 lbs. |
| Phthalic anhydride | 2,551 lbs. |
| Xylol | 575 lbs. |
| 4-tertiary butyl catechol (as stabilizer) | 15 ozs. |
| Stabilizer A[1] | 23 lbs. 8 ozs. |
| Rubber grade styrene | 2,820 lbs. |
| Total | 1,000 gallons. |

[1] Stabilizer A is prepared by mixing the following:

| | Lbs. |
|---|---|
| Acetamidine hydrochloride | 20 |
| Propylene glycol, ind. grade | 80 |

The mixture is heated to from 130-150° F. to dissolve the components. This stabilizer is described and claimed in co-pending application Serial No. 572,192, filed March 19, 1956, now U.S. Patent No. 2,846,411.

The above ingredients were reacted in the usual manner; that is, the first four ingredients were reacted to give a product having an acid number of around 50, after which the xylol was stripped off in vacuum. The batch was cooled somewhat and the stabilizers added and thoroughly mixed in. Then after further cooling, the styrene was added. The resulting solution had a Gardner-Holdt viscosity of U–V at 77° F., and color of 1–2 (Gardner), and acid number of 28–32, and weight of 9.4 lbs. per gallon.

Part 2

A gelable polyester base of a paste consistency was prepared from polyester A and the following components:

| | | |
|---|---|---|
| Magnesium silicate (No. 399SS) | lbs | 180 |
| Silica Gel (Cab-o-sil)[1] | lbs | 50 |
| Polyester A | lbs | 900 |
| Inhibitor [2] | liquid ounces | 20 |
| Total | gallons | 106 |

[1] The silica gel is a pulverized dehydrated gel in an uncompressed state.
[2] The polymer inhibitor is prepared as follows:

| | | |
|---|---|---|
| Quinone | ozs | 13½ |
| Butyl alcohol | pints | 4 |
| Styrene | do | 4 |

The quinone is added to the butyl alcohol and styrene and is agitated until dissolved. No heat is used.

All of the above materials are run over a roller mill to a fineness of 1–2. A grind gage is used to evaluate the fineness of grind. The grind gage consists of a steel plate containing a wedge shaped channel of various lengths and widths, and ranging from zero to 0.004 inch in depth. The gage is calibrated to the North standard as follows:

| North standard: | Inch |
|---|---|
| 0 | 0.004 |
| 1 | 0.0035 |
| 2 | 0.003 |
| 3 | 0.0025 |
| 4 | 0.002 |
| 5 | 0.0015 |
| 6 | 0.001 |
| 7 | 0.0005 |
| 8 | 0.000 |

To evaluate the fineness of grind, the gage is laid flat, the deep end is slightly overflowed with paint. With a scraper the paint is drawn toward the shallow end of the channel. Immediately view the drawdown obliquely and note where the coarse particles appear on the surface of the film.

The gelable polyester base is characterized by a weight of 10.65 lbs. per gallon. It can be stored in lined containers.

Part 3

A liquid polyester resin (designated polyester C) of the flexible type was prepared in a similar manner to polyester A from the following components:

| | |
|---|---|
| Diethylene glycol (1.10 mols) | 3,587 lbs. |
| Maleic anhydride (0.50 mol) | 1,507 lbs. |
| Adipic acid (0.50 mol) | 2,245 lbs. |
| Xylol (8%) | 587 lbs. |
| Stabilizer A (see polyester A) (0.25%) | 23 lbs. 4 ozs. |
| 4-tertiary butyl catechol (0.01%) (as stabilizer) | 15 ozs. |
| Rubber grade styrene (30%) | 2,790 lbs. |
| Total | 1,000 gallons. |

The first four ingredients were reacted to an acid number of about 23, stripped, cooled, the stabilizers added, further cooled and styrene added. The final product had an acid number of around 15, a color (Gardner) of 2–3, and a viscosity of D–F (Gardner-Holdt) at 77° F. Weight 9.3 lbs. per gallon.

Part 4

A black (pigmented) polyester resin concentrate of a liquid consistency for use in my invention was prepared by first preparing a polyester grinding vehicle as follows:

| | |
|---|---|
| Propylene glycol, ind. grade (1.13 mols) lbs. | 2,249 |
| Maleic anhydride (0.50 mol) lbs. | 1,283 |
| Phthalic anhydride (0.50 mol) lbs. | 1,938 |
| Xylol (8%) lbs. | 437 |
| Stablizer A (see polyester A) lbs. | 25 |
| 4-tertiary butyl catechol (0.01%) (as stabilizer) lb. | 1 |
| Diallyl phthalate monomer (50%) lbs. | 5,000 |
| Total gallons. | 1,000 |

The first four ingredients were charged into a suitable vessel and $CO_2$ was introduced. The solution was heated to reflux (maximum temperature 375° F) and held to an acid number of 50 to 52. The solution was then vacuum stripped to 100% solids and then cooled to 240° F. Stabilizer A was then added and mixed for ten minutes. This was then followed with a 4-tertiary butyl catechol. The mixture was cooled to 200° F. and the diallyl phthalate was then added slowly and the mixture further cooled and filtered. The final polyester had an acid number of 24–26, a color (Gardner) of 2–3, a viscosity (Gardner-Holdt) of $Z-Z_1$ at 77° F. and a weight of 10.0 lbs. per gallon.

In order to form the black pigmented polyester resin concentrate, the following procedure was employed:

| | |
|---|---|
| Polyester concentrate gallons | 85 |
| Black oxide of iron lbs. | 595 |
| Total gallons | 100 |

These ingredients were ground to a fineness of 7 on a roller mill. The concentrate had a weight of 14.4 lbs. per gallon. This concentrate can be packaged in lined containers.

EXAMPLE 2

A black, gelable polyester liquid adapted to be applied to a substrate, when mixed with a polyvinyl acetate resin (see below) can be prepared from the above described polyesters of Example 1 as follows:

| | |
|---|---|
| Polyester base from part 2, Ex. 1 lbs. | 600 |
| Polyester C from part 3, Ex 1 gallons | 16 |
| Rubber grade styrene do | 20 |
| Black polyester concentrate from part 4, Ex. 1 lbs. | 100 |
| Cobalt naphthenate (6% cobalt) gallons | 0.75 |
| Total do | 100 |

The above ingredients are mixed to form the pigmented gelable polyester coat to be applied to the substrate in conjunctions with polyvinyl acetate resin. The liquid gelable coat is characterized by a viscosity, full body, of 3000 to 35000 cps. at 77° F. measured with a Brookfield viscosimeter and a weight of 9.95 lbs. per gallon. The liquid can be catalyzed if desired, although as noted above this is not necessary, with 2% by weight of Lupersol DDM catalyst. The resulting pot life when catalyzed is about fifteen to twenty minutes.

The polyvinyl acetate resin to be incorporated with the gelable polyester resin of Example 2 is prepared as follows:

EXAMPLE 3

| | |
|---|---|
| Rubber grade styrene gallons | 80 |
| Polyvinyl acetate resin [1] lbs. | 200 |

[1] This resin is Bakelite Company's "Vinylite AYAT."

The resin is a solid characterized by an intrinsic viscosity in cyclohexanone at 20° C. of 0.69, a high softening point and is soluble in ketones, aromatics, alcohols, etc.

The solution is prepared by cold cutting the polyvinyl acetate resin with the styrene, using no heat and good agitation. The solution is characterized by a Gardner-Holdt viscosity of U at 77° F., non-volatile 25% and a weight of 8.0 lbs. per gallon.

EXAMPLE 4

A webbing polyester-polyvinyl acetate solution (preferably without a catalyst) can then be prepared for application to a substrate by adding one part by volume of the polyvinyl acetate resin solution of Example 3 to four parts of the gelable polyester solution of Example 2 by volume. After mixing, the material is ready to be sprayed, or can be packaged in lined containers.

Other examples of gelable polyester resins that can be employed either to be mixed with the polyvinyl acetate resin or to be used as the background coat can be formulated as follows:

EXAMPLE 5

Part 1

A liquid polyester resin (designated polyester B) of the semi-rigid type was prepared in a similar manner to polyesters A and C from the following components:

| | |
|---|---|
| Propylene glycol | 2,990 lbs. |
| Maleic anhydride | 1,750 lbs. |
| Adipic acid | 2,610 lbs. |
| Styrene | 2,735 lbs. |
| Xylol | 588 lbs. |
| 4-tertiary-butyl catechol | 0.9 lb. |
| Stabilizer A (see polyesterA) | 23 lbs. 8 oz. |

Part 2

A white gelable polyester resin can be prepared by employing appropriate amount sof the various polyesters. Thus:

| | |
|---|---|
| Titanium dioxide | 3 lbs. 3 ozs. |
| Silica | 2 lbs. 5 ozs. |
| Polyester A | 4⅛ pints. |
| Polyester B | 1¾ pints. |
| Polyester C | 1⅛ pints. |
| Styrene | 1 pint. |
| Inhibitor of Ex. 1, part 2 | ⅛ liquid-oz./gal. |

Additional quinone can be added to the above formulation if desired.

In making the above gelable resin, enough polyester A is added to the first two items to make a heavy paste. The mixture is then agitated in a Baker-Perkins agitator for at least an hour until the pigments are well mixed and then the balance of the resin and styrene is added very slowly. The mixture is then agitated until uniform. An alternate method of dispersion is the use of pebble milling of the entire formula for twelve to sixteen hours.

*Part 3*

A translucent gelable polyester resin can be prepared by mixing the following:

| | |
|---|---|
| Silica | 3 lbs. |
| Polyester A | 5 pints. |
| Polyester C | 2 pints. |
| Styrene | 1 pints. |
| Inhibitor as in part 2 | ⅛ liq. oz./gal. |

Process as above in part 2.

Examples of other gelable polyester resins can be prepared from the teaching of U.S. Serial No. 612,072, filed September 25, 1956, referred to above and made a part of this disclosure.

In actual practice I have prepared several very attractive coatings of varied cobweb designs by employing combinations of the above noted resins with the gelable polyester resins of Example 5, parts 1 and 2. I have employed 1% by weight of methyl ethyl ketone peroxide (60% solution as is supplied by Lucidol under the trade name of "Lupersol DDM"). For cold mold work, 1% by weight of Lupersol DDM and 1 to 2% by weight of an accelerator i.e. 2% cobalt metal in styrene, is recommended. Depending on room temperature, the gelable polyester coating will gel in from five to fifteen minutes.

For hot molding work (220 to 250° F.), 1% benzoyl peroxide is recommended. In this instance, when preparing a mold for example, the polyester will gel almost instantly.

The gelable polyester-polyvinyl acetate resins and the gelable polyester background or color imparting coating of my invention can be applied to a large variety of substrates upon which a decorative coating is desired e.g. metal, wood, ceramics, etc.; or, polyester-fiberglass shower stalls, interior finishes etc.

An attractive laminate can be fabricated by the following example:

(1) A mold is waxed and buffed.

(2) A while spatter coat (not catalyzed) of a webbing-gelable polyester resin is applied to the mold by spraying (decorative finish type).

(3) A black spatter coat as in 2 is then applied.

(4) A pigmented gelable polyester resin (red or any other compatible color) is catalyzed with 2% Lupersol DDM and is applied by spraying (background coat).

(5) The laminate is built up over the red polyester resin coat after the coat has gelled and started to cure (approximately ½ hour at 75° F.). The laminate consists of a polyester laminating resin reinforced with one layer of fiberglass matt (e.g. 2 ounces) between two layers of fiberglass cloth. The polyester resin is catalyzed with 1% Lupersol DDM.

(6) A gray gelable polyester containing hold-out imparting ingredients (background coat) and catalyzed with 2% Lupersol DDM is applied by spraying over the laminate after it has gelled (approximately ½ hour at 75° F.).

(7) Black and white spatter coats of webbing-gelable polyester resins (not catalyzed) are then applied by spraying before the background coat has gelled (decorative and protective finish).

(8) The laminate is removed from the mold after an overnight cure at room temperature.

The above colors were selected at random but the spatter coats and background coats can be pigmented to any desired color. The laminate can also be cured at elevated temperatures. The laminate prepared by the above series of steps presents an attractive article of manufacture, both sides of the laminate presenting a pleasing and decorative design and finish. Also, as noted, one or more spatter coats of different colored webbing-gelable polyester resin solutions can be applied to the laminate, to present a surface of varied and irregular cobweb design.

As will be appreciated from the above description of my invention, a fabricator can prepare his own webbing gelable polyester coating solutions by using the above mixtures. In the instances where the substrate is first sprayed with the webbing solution, no catalyst need be added to such and it is not necessary that the applicator immediately apply the background catalyzed polyester over the sprayed substrate since the sprayed and webbed polyester-polyvinyl acetate can be left on such a substrate for periods of time of say from one to two hours before the background coat is applied. It is preferred not to wait too long before applying the background coat since the styrene (or other monomer) may evaporate from the spatter coat composition (polyester-polyvinyl acetate solution) thereby affecting the physical properties of the spatter coat.

When the catalyzed polyester is applied first to the surface, as is preferred in the case of polyesters comprising ingredients that impart to it hold-out properties, then the polyester-polyvinyl acetate resin solution must be applied before the solution gels so that both coating and sprayed resin can be cured simultaneously. It is to be noted that one of the advantages of this invention is the fact that no catalyst is needed in the design-imparting cob-webbing solution.

Resort can be had to modifications and equivalents falling within the scope of my invention and the appended claims.

Having thus described my invention, I claim:

1. A process for preparing a decoratively-discontinuous, webby design on the surface of a substrate, comprising the steps of applying on said substrate a background coat of catalyzed polyester/monomer solution characterized by being substantially 100% polymerizable to a gel state in advance of the fully cured state, gelling said applied background coat, spraying on said background coat before it has cured a webby deposit of a homogeneous, compatible solution comprising a gelable substantially 100% polymerizable polyester/monomer solution and a web-forming polyvinyl acetate resin characterized by a molecular weight of at least 6000, and curing said polyester/monomer solutions; said polyester/monomer solutions being composed essentially of (a) polyhydric alcohol/polycarboxylic acid ester products containing a plurality of $\Delta^{2,3}$-enedioyl groups dissolved in (b) liquid monomeric compound which is copolymerizable with said enedioyl ester products by reason of the presence of a $CH_2=C<$ group in said monomeric compound.

2. A process as claimed in claim 1 wherein said sprayed solution is pigmented.

3. A process as claimed in claim 2 wherein said background coat of polyester/monomer solution contains dispersed therein a small amount of finely-divided solid hydrous inorganic material selected from the group consisting of dehydrated silica gel, short asbestos fiber, natural opaline siliceous minerals, and hydrous clays, said small amount being effective to impart holdout properties to said background coat.

4. A process as claimed in claim 1 wherein said background coat of polyester/monomer solution contains dispersed therein a small amount of finely-divided solid hydrous inorganic material selected from the group consisting of dehydrated silica gel, short asbestos fiber, natural opaline siliceous minerals, and hydrous clays, said small amount being effective to impart hold-out properties to said background coat.

5. A process for preparing a decorative resinous laminate from substantially 100% polymerizable polyester/monomer solutions which comprises the steps of (a) contacting with a layer of catalyzed and gelable but uncured polyester/monomer solution a sprayed webby deposit of gelable but uncured polyester/monomer solution having dissolved therein prior to spraying a web-forming polyvinyl acetate resin having a molecular weight of at least 6000, and (b) curing said contacting layer and the polyester/monomer solution of said sprayed webby deposit; said polyester/monomer solutions being composed essentially of (1) polyhydric alcohol/polycarboxylic ester products containing a plurality of $\Delta^{2,3}$-enedioyl groups dissolved in (2) liquid monomeric compound which is copolymerizable with said enedioyl ester products by reason of the presence in the former of a $CH_2=C<$ group.

References Cited in the file of this patent

UNITED STATES PATENTS

| | | |
|---|---|---|
| 2,345,013 | Soday | Mar. 28, 1944 |
| 2,512,410 | Adelson et al. | June 20, 1950 |
| 2,748,027 | Meier | May 29, 1956 |
| 2,787,555 | Drummond | Apr. 2, 1957 |
| 2,817,619 | Bickel et al. | Dec. 24, 1957 |
| 2,851,379 | Standinger et al. | Sept. 9, 1958 |

OTHER REFERENCES

"Polyester Lacquer Resins," by G. Sprock. Farbe and Lack, pages 181–6, vol. 62 (1956).

Finishing Handbook and Directory (1957), page 62 cited.